No. 774,861. PATENTED NOV. 15, 1904.
G. WENZELMANN.
HAY RACK CLAMP.
APPLICATION FILED FEB. 19, 1904.
NO MODEL. 2 SHEETS—SHEET 1.
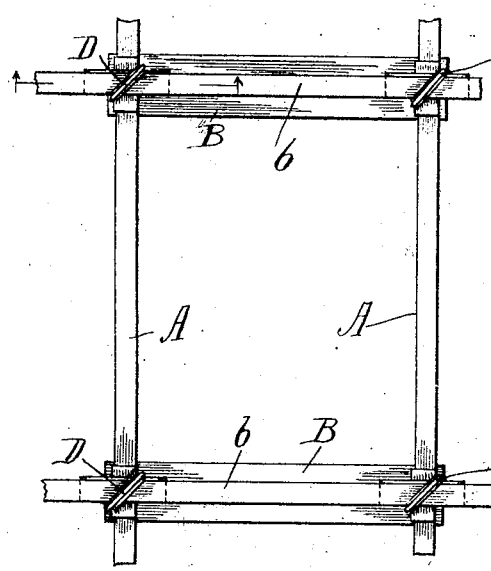
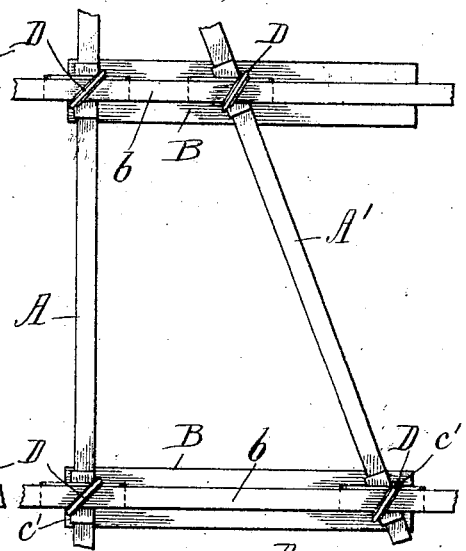
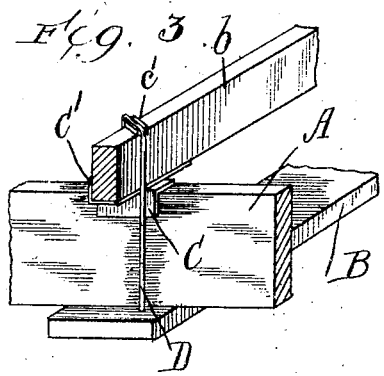
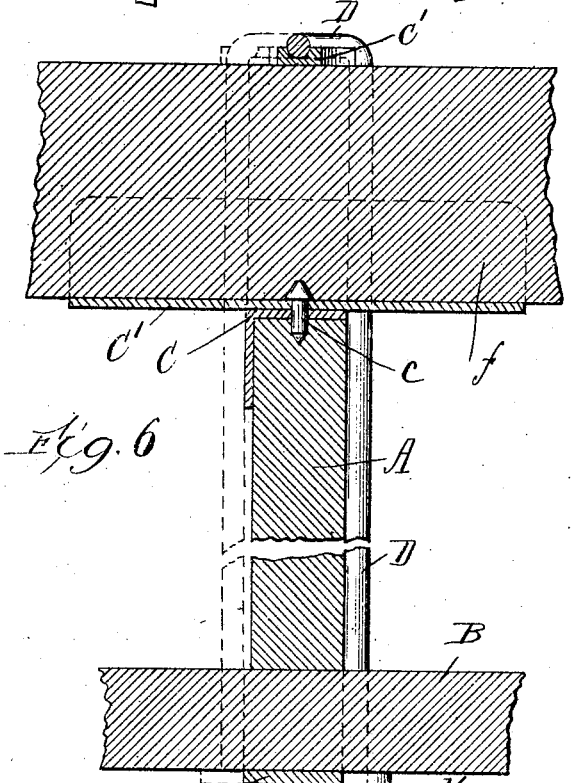
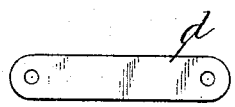
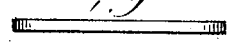
Witnesses: Inventor:
Gustave Wenzelmann

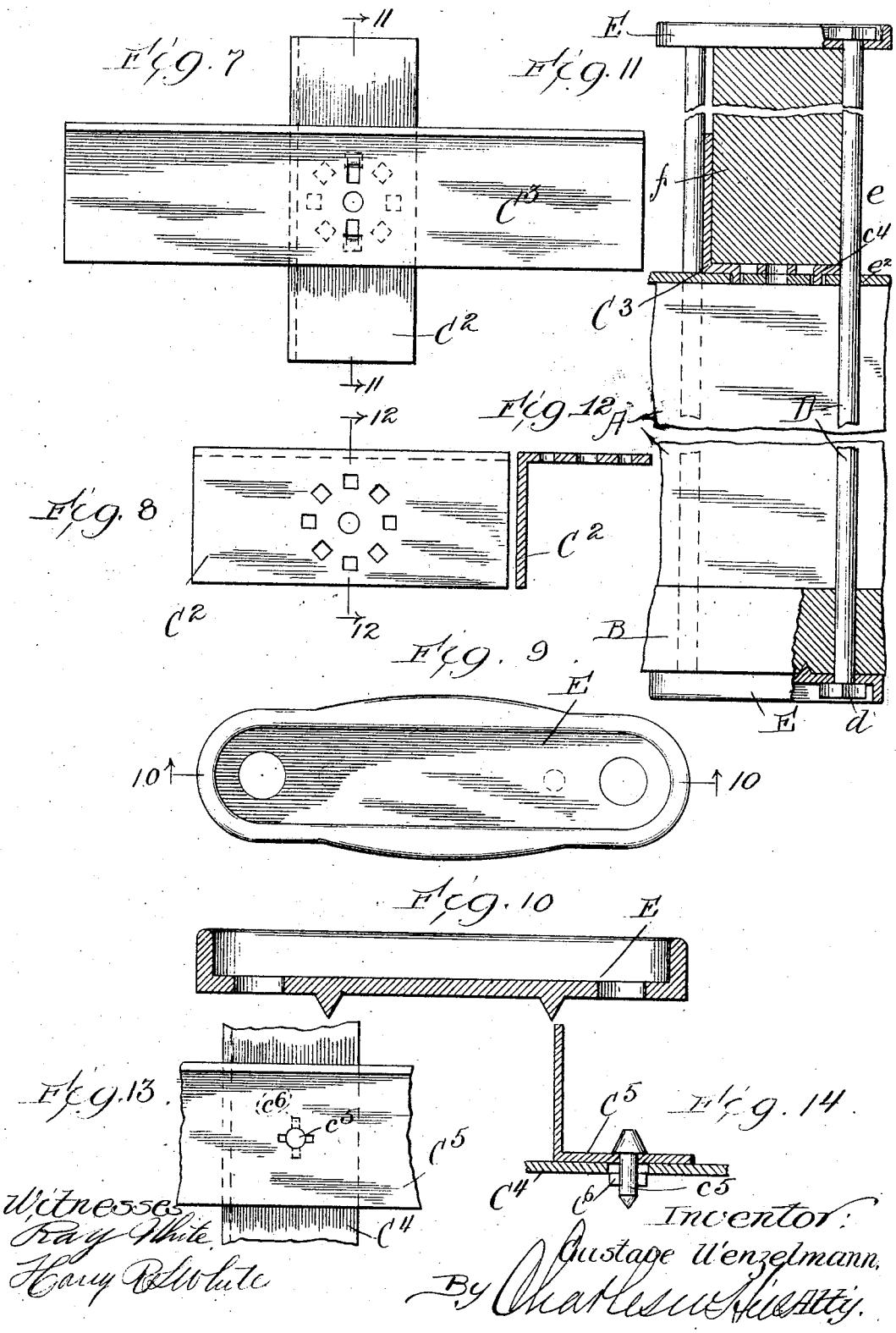

No. 774,861.

Patented November 15, 1904.

UNITED STATES PATENT OFFICE.

GUSTAVE WENZELMANN, OF STREATOR, ILLINOIS.

HAY-RACK CLAMP.

SPECIFICATION forming part of Letters Patent No. 774,861, dated November 15, 1904.

Application filed February 19, 1904. Serial No. 194,347. (No model.)

*To all whom it may concern:*

Be it known that I, GUSTAVE WENZELMANN, a citizen of the United States, and a resident of Streator, Lasalle county, Illinois, have invented certain new and useful Improvements in Hay-Rack Clamps; and I do hereby declare that the following is a full, clear, and exact description of the same, reference being had to the accompanying drawings, and to the letters of reference marked thereon, which form a part of this specification.

This invention relates to improvements in clamps designed to secure a longitudinal and transverse timber or cross-sills of any desired construction together in unvarying relation, and is shown more particularly in relation with a hay-rack, though obviously the construction is useful for any purpose in which it is desired to secure timber, beams, or the like one upon another at an angle with each other.

With the cross-sill supports or clamps heretofore devised it has not been practicable to secure the timbers or cross-sills together at an angle other than that for which the clamps are specially constructed, (usually a right angle.) It is also true that in many of the prior constructions, owing to the short bearing of the intermediate plate upon the timbers or engaged members, maximum strength has not been secured.

It is the object of this invention to provide a clamping device adapted to rigidly secure cross sills or timbers together for any desired purpose at any desired angle with each other without cutting, boring, or otherwise weakening the structure.

It is also an object to afford a long bearing for each timber upon the other, thereby greatly increasing the strength of the construction.

The invention consists in the construction hereinafter described, and more fully pointed out and defined in the appended claims.

In the drawings, Figure 1 is a fragmentary plan view of a hay-rack or other structure to which my invention is applied. Fig. 2 is a similar view showing one of the longitudinal members secured at other than a right angle with the transverse member or members. Fig. 3 is an enlarged fragmentary detail of the construction. Figs. 4 and 5 are plan views and edge views, respectively, of the bottom washer. Fig. 6 is an enlarged fragmentary transverse section illustrating the application of the clamp. Fig. 7 is an enlarged top plan view of the intermediate angle-plates adapted to engage between the supporting and the supported timber or timbers. Fig. 8 is a top plan view of one of the intermediate angle-plates. Fig. 9 is a top plan view of the upper washer or tie-plate. Fig. 10 is a section taken on line 10 10 of Fig. 9. Fig. 11 is a fragmentary section taken on line 11 11, as Fig. 7, showing the timber or the connecting members in plates. Fig. 12 is a section on line 12 12 of Fig. 8. Fig. 13 is a slightly-modified fragmentary plan view of the intermediate members, illustrating a slightly-modified means for connecting the same. Fig. 14 is a transverse section of the same.

As shown in said drawings, the invention is for convenience indicated as applied to a hay-rack, though obviously adapted for any other purposes. A A indicate the longitudinal members or sills of the rack, which are usually formed of parallel planks of a sufficient thickness and width and which are connected transversely at the bottom by any desired number of transverse ties B B. Across the top of said sills A extend the transverse beams $b$, which may be of any desired size or length and afford the lateral extension for the rack.

C C' indicate angle plates or bars of any size, length, or width to provide a desired length and width of bearing for the members to be engaged thereby. The web of each of said angle-plates is provided with a central aperture adapted to receive a pin $c$, which holds said plates, one upon the other, from slipping, and said plates are placed with the flanges thereof oppositely directed and the web of one contacting with the web of the other, as shown in Figs. 3 and 7, and are interposed between the members to be engaged together, the flange of each extending along the side of the member engaged and affording a rigid bearing and brace therefor. Extending across the top of the uppermost sill member (in the present instance the beam $b$) is a washer or bearing-plate $c'$, provided, as shown, with a longitudinal groove in its top, in which rests the bend of the hooked bolt D, which engages over the joint formed by the intersection of said timbers formed by the lap of said crossed sills and the ends of which extend through the transverse tie member B. Washers $d$ are provided below the tie members, through which the end or ends of said bolts extend and beneath which engage the nuts $d'$, by which are firmly drawn and secured together the connected members, thus holding them in unvarying relation. The pin $c$ is provided with somewhat pointed ends, which indent and are bedded in the upper and lower members and serve to hold the same from any tendency to slip.

Obviously as the angle-plates C C' are unconnected other than by the pin $c$ they may be adjusted at any desired angle with respect to each other, thus enabling sill members to be connected at any desired angles with each other, as shown in Fig. 2, in which the constructions are as before described, with the exception that one of the longitudinal sill members (indicated by A') is arranged obliquely with the corresponding sill A. The clamp engages the sills firmly together, however, and may be engaged over either the longer or shorter bearing, as preferred.

If preferred and conveniently, one of the angle-bar or plate sections may be provided with a plurality of apertures arranged concentric with the aperture for the central pin, as shown in Fig. 8, and the other of said angle-plates $C^3$ in this event is provided with one or more downwardly-turned projections $c^4$, which may be formed by punching the metal inwardly, as indicated in Figs. 7 and 11, or in any preferred manner. Said inwardly-turned projections of the angle-plate $C^3$ are adapted to engage in one or more of the apertures in the angle-plate $C^2$, enabling said angle-plate section to be interlocked at any of the more usual and convenient angles at which the members to be connected are likely to be joined. If preferred, also, the upper bearing-strap for the clamping-bolt can be constructed as shown in Figs. 9 and 10, in which a casting or forging is provided with peripheral rib, affording a longitudinal recess therein in the top of said strap, and is apertured at its ends to receive the ends of the clamping bolt or bolts, which may be ordinary bolts $e$, as shown in Fig. 11, or may be a bent or hooked clamping-bolt D, as shown in Figs. 1 to 6, inclusive. In this construction the bearing-strap E is provided with one or more spurs on the under side thereof adapted to engage in the member upon which secured.

If preferred, the angle-plates may be pivotally connected together by means of a pin $c^5$, similar to the pin $c$, but which is provided at its lower end with a transverse key $c^6$, which may be either removably secured in a seat in said pin or may be integrally or otherwise permanently connected therewith, as preferred. In this construction the angle-plates $C^4 C^5$ are each provided with a central aperture, as before described, which is slotted on opposite sides, as shown in Figs. 13, 14, to permit the passage of the pin with its key therethrough. When the key is in place, one of said bearing-plates is turned with respect to the other at the desired angle, thus arranging the key in position to lock said plates together, as shown in Fig. 14.

The operation is as follows: The bearing-plates may be constructed of sections of angle-bar, channel-bar, or any other structural metal of any desired width or length cut to the desired size or of plates bent to the desired shape and arranged one on the other. If preferred, however, the bearing-plates may be rigidly secured together at the desired angle of intersection of the parts to be connected, and, if preferred, said bearing-plates may be formed integrally by casting, forging, or in any suitable manner of any desired length to afford a positive support and an elongated bearing for the members to be connected at their point of intersection.

Obviously should it be desired to connect a greater number of crossed sills arranged at angles with each other any number of additional bearing members or angle-plates may be secured together by means of the said clamping-bolt, thus admitting of connecting any desired number of intersecting members at varying angles with each other.

While I have described my construction as is applicable as a hay-rack clamp, I do not desire to be limited to this specific use for my invention, as obviously the invention is capable of use wherever members are to be connected upon and at an angle each with the other, and I do not desire to be limited to the specific construction herein shown and described, as obviously many details of construction may be varied without departing from the principle of my invention.

I claim as my invention—

1. A cross-sill bearing-plate comprising an elongated plate adapted to engage between the sills and provided on opposite sides with a flange adapted to bear against the sides of the members connected, a plate arranged obliquely on the upper sill and a clamping-bolt engaging said plate and extending alongside of the joint acting to bind said sills together.

2. A clamp of the class described, comprising in combination, a plurality of flanged plates adapted to be arranged in an angle with each other and affording a bearing between cross-sills or the like, a bearing-strap adapted to be arranged on and obliquely with the sills above the joint, a clamping-bolt engaging the ends of the bearing-strap of the upper sill and extending below the lower and acting to jam the same in positive engagement with said plates.

3. A cross-sill bearing-plate of the class described, comprising a metallic plate having longitudinally and laterally directed ends and having a flange on each side thereof, one arranged along the end of the longitudinal ends and the other arranged along the edge of the transverse ends and a centrally-disposed projection on each side of the plate adapted to engage in sills and a clamping-bolt straddling the joint and binding the sills together.

4. The combination with crossed sills of a clamping-bolt straddling the joint, a plurality of flanged clamping-plates adapted to engage between the sills and adjustable with respect to each other at varying angles.

5. The combination with crossed sills of a clamping-bolt, binding the same together, independently-adjustable flanged plates arranged one upon the other between said sills, means engaging the same from relative movement and a projection on each plate adapted to engage in the sill.

6. In a device of the class described, flanged plates adapted to engage one upon and at any desired angle with the other with the flange directed oppositely and means adapted to engage said plates together in adjusted position.

7. A clamping-plate of the class described comprising flanged plates arranged one upon and at an angle with the other with the flanged directed oppositely, means locking said plates in adjusted position and a pin having pointed ends passing through each.

8. A middle bearing for crossed members comprising angle-plates to engage said crossed members, a central aperture in each plate, a pointed pin extending therethrough and adapted to engage in the crossed members and interlocking means acting to hold said plates at an adjusted angle.

9. A clamp of the class described, comprising clamping-bolts and an intermediate two-part bearing each part having one or more lateral flanges and one or more projections on one of said plates adapted to fit into apertures in the other.

10. A clamping-plate of the class described, a hooked clamping-bolt, a recessed bearing-plate adapted to engage in the bend of said bolt, bearing-plates adapted to be engaged on the ends of said bolt and a plurality of adjustable flanged clamping-plates adapted to be arranged at different angles with each other with the flanges thereof directed oppositely.

In testimony whereof I undersigned and subscribed my name in the presence of two subscribing witnesses.

GUSTAVE WENZELMANN.

Witnesses:
C. W. HILLS,
W. W. WITHENBURY.